United States Patent
Chaiken et al.

(10) Patent No.: US 11,579,893 B2
(45) Date of Patent: Feb. 14, 2023

(54) SYSTEMS AND METHODS FOR SEPARATE STORAGE AND USE OF SYSTEM BIOS COMPONENTS

(71) Applicant: DELL PRODUCTS L.P., Round Rock, TX (US)

(72) Inventors: Craig L. Chaiken, Pflugerville, TX (US); Michael W. Arms, Pflugerville, TX (US); Richard M. Tonry, Austin, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 16/388,067

(22) Filed: Apr. 18, 2019

(65) Prior Publication Data
US 2020/0334045 A1    Oct. 22, 2020

(51) Int. Cl.
*G06F 9/4401* (2018.01)
*G06F 21/57* (2013.01)

(52) U.S. Cl.
CPC .......... *G06F 9/4403* (2013.01); *G06F 9/4411* (2013.01); *G06F 21/575* (2013.01)

(58) Field of Classification Search
CPC .... G06F 21/575; G06F 9/4403; G06F 9/4406; G06F 9/4411; G06F 9/44505; G06F 9/451; G06F 9/547; G06F 2209/549
See application file for complete search history.

(56) References Cited

U.S. PATENT DOCUMENTS

| | | | |
|---|---|---|---|
| 9,015,456 B1* | 4/2015 | Spangler | G06F 9/4403 713/1 |
| 2002/0162093 A1* | 10/2002 | Zhou | G06F 9/454 717/130 |
| 2004/0236567 A1* | 11/2004 | Rothman | G06F 9/4401 704/8 |
| 2005/0144609 A1* | 6/2005 | Rothman | G06F 11/1433 717/168 |
| 2006/0020810 A1* | 1/2006 | Waltermann | H04L 9/3247 713/179 |
| 2006/0174055 A1* | 8/2006 | Flynn | G06F 9/4406 711/100 |

(Continued)

OTHER PUBLICATIONS

Chaiken et al., "Systems and Methods for Creating and/or Modifying Memory Configuration Settings", U.S. Appl. No. 16/116,002, filed Aug. 29, 2018, DELL:242; 42 pgs.

(Continued)

*Primary Examiner* — Jaweed A Abbaszadeh
*Assistant Examiner* — Brian J Corcoran
(74) *Attorney, Agent, or Firm* — Egan, Enders & Huston LLP.

(57) ABSTRACT

Systems and methods are provided for supporting use of system BIOS components (e.g., such as BIOS debug messages, debugger firmware, UEFI drivers, etc.) that are stored separately from the remainder of system BIOS firmware for an information handling system. The system BIOS components may represent only a portion of the total BIOS firmware, and may be selectively retrieved and loaded from the separate storage into system memory when needed by the system BIOS for operating purposes (e.g., such as debugging operations).

26 Claims, 10 Drawing Sheets

(56) References Cited

U.S. PATENT DOCUMENTS

2008/0072211 A1* 3/2008 Rothman ............ G06F 9/44573
717/122
2016/0041895 A1* 2/2016 Galvin .................. G06F 40/242
717/130

OTHER PUBLICATIONS

Grobelny et al., "Systems and Methods for Control Flow Integrity in System Management Mode (SMM)", U.S. Appl. No. 16/182,192, filed Nov. 6, 2018, DELL:248; 26 pgs.
Dhoble et al., "Systems and Methods for Key-Based Isolation of System Management Interrupt (SMI) Functions and Data", U.S. Appl. No. 16/182,236, filed Nov. 6, 2018, DELL:249; 28 pgs.
Montero et al., "Information Handling System and Method for Restoring Firmware in One or More Regions of A Flash Memory Device", U.S. Appl. No. 16/229,264, filed Dec. 21, 2018, DELL:253; 35 pgs.

* cited by examiner

```
EFI_STATUS                              Original Source.c File
EFIAPI
BdsLibBootViaBootOption  (
   IN  BDS_COMMON_OPTION         *Option,
   IN  EFI_DEVICE_PATH_PROTOCOL  *DevicePath,
   OUT UINTN                     *ExitDataSize,
   OUT CHAR16                    **ExitData OPTIONAL)
{
   EFI_STATUS  Status = EFI_SUCCESS;
   DEBUG ( (DEBUG_INFO | DEBUG_LOAD, "Booting from unknown device path\n") );
   return Status;
}
```
— 1102

```
typedef unsigned _int32    UINT32;
typedef unsigned _int64    UINT64;
typedef UINT64             UINTN;
typedef UINTN              RETURN_STATUS;
typedef RETURN_STATUS      EFI_STATUS;
typedef unsigned short     CHAR16;
typedef unsigned char      BOOLEAN;
typedef char               CHAR8;

BOOLEAN _cdecl DebugPrintEnabled ( void );
BOOLEAN _cdecl DebugPrintLevelEnabled (const UINTN   ErrorLevel );

EFI_STATUS _cdecl BdsLibBootViaBootOption (
   CHAR16                 **ExitData )
{
   EFI_STATUS Status = 0;
   do { if (DebubPrintedEnabled ()) { do { if (DebugPrintLevelEnabled (0x00000040 | 0x00000004) ) {
   DebugPrint (0x00000040 | 0x00000004, "Booting from unknown device path\n"); } } while (((BOOLEAN) (0==1) ) );
   } } while ( ( (BOOLEAN) (0==1) ) );
   return Status;
}
```
— 1104

With the /EP flag, the compiler generates a *.i file that can be directly compiled

```
typedef unsigned _int32    UINT32;
typedef unsigned _int64    UINT64;
typedef UINT64             UINTN;
typedef UINTN              RETURN_STATUS;
typedef RETURN_STATUS      EFI_STATUS;
typedef unsigned short     CHAR16;
typedef unsigned char      BOOLEAN;
typedef char               CHAR8;

BOOLEAN _cdecl DebugPrintEnabled ( void );
BOOLEAN _cdecl DebugPrintLevelEnabled (const UINTN   ErrorLevel );
CHAR8* _cdecl GetStringById (UINT32 StringId) ;

EFI_STATUS _cdecl BdsLibBootViaBootOption (
   CHAR16                 **ExitData )
{
   EFI_STATUS Status = 0;
   do { if (DebubPrintedEnabled ()) { do { if (DebugPrintLevelEnabled (0x00000040 | 0x00000004) ) {
   DebugPrint (0x00000040 | 0x00000004, GetStringById(0x1234) ); } } while ( ( (BOOLEAN) (0==1) ) ); } } while
   ( ( (BOOLEAN) (0==1) ) );
   return Status;
}
```
— 1106

After the preprocessor step, Source.i is scanned and the string is replaced with GetStringById(<ID>), where <ID> is unique to this line of code

*FIG. 11*

SYSTEMS AND METHODS FOR SEPARATE STORAGE AND USE OF SYSTEM BIOS COMPONENTS

FIELD

This invention relates generally to information handling systems, and more particularly, to non-volatile storage of BIOS firmware for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer system platform firmware is typically stored at time of manufacture in a Serial Peripheral Interface (SPI) Flash memory storage device that is soldered to each motherboard of each computer system platform that is shipped by a computer manufacturer. These SPI Flash memory device stores the platform firmware that is used to configure and boot the computer system platform, including the Basic Input/Output System (BIOS). In particular, BIOS firmware is used to configure computer platform hardware and prepare the hardware for use either as a stand-alone device, or as part of a system to support an operating system (OS), such as Linux and Windows. Debug capabilities including debug strings and references to debug files are also embedded in the firmware code during build time.

Since the debug strings are embedded in the code during build time, debug strings and references to debug files can be viewed as ASCII text in the firmware binary and/or at runtime in memory to potentially assist an adversary in reverse engineering the code, or discovering security vulnerabilities in the code. Therefore, for security and intellectual property purposes, firmware released to customers is often built and shipped with purchased systems to the customers with debug strings and references to debug files removed. While the removal of debug strings helps to mitigate against information disclosure type attacks, it makes debugging of a customer system more complicated unless the missing debug strings and debug file references are later installed.

The SPI flash memory part is a relatively expensive component of a computer system, so a computer manufacturer often installs and ships the smallest practical memory capacity SPI Flash part with the computer. In the past, 32 megabyte (MB) Flash memory chips have been a standard SPI Flash memory size installed on new computer systems. Recently, interest has grown in reducing capacity of computer system SPI Flash chips to 16 MB to reduce system cost. However, adding debug strings and debug file references to the firmware takes up additional space on the system SPI Flash memory storage device.

The size of the firmware on existing computer system platforms is limited by the SPI flash memory capacity of the device that was soldered onto the platform motherboard during product manufacturing. A 16 MB Flash part is so small that it cannot always contain the full size of the updated BIOS debug messages and debug file references that are currently required for an existing computer platform. Where this is the case, a technician must rework the mother board in the field to install a higher capacity SPI Flash memory part to hold added debug strings and debug file references when a computer system from the field must be debugged. In this case, all debugging must be done on such computer systems after they have been reworked with the larger SPI Flash memory storage part. This rework delays debug efforts and can potentially prevent the system from being returned to customer stock. Furthermore, replacing the SPI Flash memory storage part for debug can change the behavior of the computer system, thus impacting the ability to reproduce the issue.

Moreover, over time as the system firmware requirements become more sophisticated, the minimum size requirement of the SPI flash memory device also grows. In such a case, a computer system manufacturer has the option to manufacture the motherboard of new systems with a larger installed SPI Flash memory storage device to accommodate new larger system firmware size even though this leads to additional cost. However, while the originally-installed release mode BIOS shipped to customers can fit on the previous smaller SPI Flash memory part of existing systems, the new debug mode BIOS required for development, sustaining, and handling field escalations cannot fit on these smaller SPI Flash memory parts. This adversely impacts computer system platforms already deployed in the field, requiring considerable cost to rework and increase the size of the SPI flash memory device installed on an existing field-deployed computer platform. Especially adverse impacts are encountered in those cases where it is not practical to increase the capacity of the existing SPI Flash memory storage device on the motherboard of an existing field-deployed computer platform, since this prevents a debug firmware, containing debug strings for quality and root cause analysis, from fitting onto the existing SPI Flash memory storage device that was shipped with the platform.

For debugging purposes, it is known to send message text to a remote computer which translates the output. The message text may be sent in multiple different languages. However, the messages are not validated, and there is no way to turn debug on and off since a conventional BIOS is either a debug mode BIOS that always sends debug messages, or a release (non-debug) mode BIOS that never sends debug messages.

SUMMARY

Disclosed herein are systems and methods that may be implemented to support use of supplemental system BIOS components (e.g., such as BIOS debug messages, debugger firmware, UEFI drivers, etc.) that are stored separately from the remainder of system BIOS firmware for an information handling system. In one embodiment, such supplemental system BIOS components may represent only a portion of the total BIOS firmware and may be stored separately (e.g., in non-volatile storage that is external to the system motherboard and/or the system platform) from the remainder of system BIOS firmware that is stored in integrated non-volatile storage on the system motherboard. The separately-stored BIOS components may then be selectively retrieved and loaded from the separate storage into system memory when needed by the system BIOS for operating purposes (e.g., such as debugging operations).

In one embodiment, designated system BIOS components (e.g., such as BIOS debug messages) may be extracted from the remainder of the system BIOS firmware at the BIOS firmware build time (e.g., as individual BIOS strings that correspond to extracted BIOS messages), and these extracted BIOS components may be moved to a secure indexed file that may be stored separately from the remaining system BIOS firmware that still includes the BIOS debug code. The extracted BIOS components may be stored and indexed by number (or other unique identifier such as alphanumeric characters) on non-volatile storage, for example, on internal system hard drive (hard disk drive, solid state drive, etc.), external system hard drive (hard disk drive, solid state drive, etc.), system internal non-volatile memory (e.g., discrete system Flash memory external to the system motherboard), external non-volatile memory (e.g., such as USB Flash drive), network storage, etc.

In one embodiment where extracted BIOS components comprise BIOS debug strings that are each indexed by a unique number, the remaining debugging code of the system BIOS (sans the BIOS debug messages) may form a non-debug mode system BIOS code that may be stored on non-volatile storage (e.g., such as SPI Flash chip) which is soldered on or otherwise integrated with a motherboard of an information handling system. When the debugging code is executed from the motherboard non-volatile storage, it may retrieve a BIOS string corresponding to any given BIOS debug message as needed from the separate storage by referencing an appropriate index number of a BIOS string corresponding to the needed BIOS debug message. In a further embodiment, authentication may be first required before the system BIOS code is allowed to access and retrieve the separately-stored and indexed BIOS debug strings.

Upon each normal system power up and re-boot, the non-debug system BIOS may be loaded from the integrated motherboard non-volatile storage, and executed on the information handling system without the BIOS debug messages. However, when access to the BIOS debug messages is needed or otherwise desired for debugging purposes, the non-debug mode BIOS firmware may be loaded and executed to look for the separately-stored secure indexed file containing the corresponding BIOS debug strings. For example, if a certain keyboard hotkey is pressed at power-up, the system BIOS executing on a processing device of the information handling system may be programmed to look for the separately-stored BIOS debug string file on an internal or external system hard drive (or on other type of non-volatile storage or memory) that is coupled to the processing device of the information handling system. Upon successful location and verification of the secure indexed debug string file, the debug strings may be loaded into memory, and debug strings enabled as messages to be logged, to effectively convert the non-debug mode BIOS into a debug mode BIOS, e.g., without requiring a SPI Flash memory update. In another embodiment, a similar mechanism may be implemented to install separately-stored Unified Extensible Firmware Interface (UEFI) drivers into system memory from an internal or external hard drive, e.g., to enhance system BIOS functionality in the field, without requiring a permanent BIOS update.

In one embodiment, the disclosed systems and methods may be implemented to extract and move a portion of system BIOS components that correspond to less-frequently used BIOS features (e.g., such as BIOS debug messages or a built-in debugger) off of a motherboard-attached non-volatile storage (e.g., such as an integrated Serial Peripheral Interface "SPI" Flash memory part) to separate storage or memory that is external and non-integrated with the motherboard. This allows a smaller and less costly memory part (e.g., SPI Flash part) containing the balance of the BIOS firmware to be integrated with the motherboard than would otherwise be possible if the extracted BIOS components were not removed. At the same time, the extracted BIOS components are accessible when needed on the separate external storage or memory to the remainder of the executing system BIOS, such that system BIOS functionality (e.g., debugging functionality) is not limited. This capability allows a reduced-size SPI Flash memory to be successfully employed for storing the remainder of the BIOS firmware, without making system debugging more difficult, time consuming, and/or expensive, as would be the conventional case if BIOS debug messages were removed from the motherboard SPI Flash memory. In this regard, debugging a conventional information handling system returned from the field is difficult in the absence of debug messages, while replacing the entire system BIOS on a conventional information handling system with a new BIOS version is likely to make field failures disappear, making it impossible to debug. In contrast, using the technique of this embodiment to load the BIOS debug strings as messages from an external source to the motherboard allows normal debugging to proceed and does not require replacement of the entire system BIOS and/or motherboard integrated non-volatile storage.

In another embodiment, a debug mode BIOS firmware that is stored with its default debug messages on system motherboard integrated non-volatile memory may be supplemented with additional (e.g., customized) debug messages that are stored as BIOS debug strings separate from the motherboard, and only retrieved when needed for debugging purposes.

Features of the disclosed systems and methods that may be implemented together or separately include, but are not limited to: 1) a non-debug mode release mode BIOS that may be turned into a debug mode BIOS without any flash update; 2) a system may implement a debug mode for the system BIOS that is sticky across warm and cold boots, but then revert to a non-debug release mode upon occurrence of an ACPI G3 exit; 3) extracted BIOS debug messages may be stored as BIOS debug strings in an external file that may be read immediately after memory initialization; 4) the data contents of such a BIOS debug string external file may be validated via a BIOS known key and a memory buffer containing the BIOS debug sting external file may be zeroed if the data in the external file is found to be invalid; 5) individual BIOS debug strings of the external file corresponding to respective BIOS debug messages may be indexed (e.g., as numbered entries in a BIOS debug table) for BIOS debug string retrieval when indicated; 6) a pre-processor BIOS build may be employed to create the BIOS debug string external file and change BIOS debug message calls to BIOS debug string number calls corresponding to the BIOS debug table entries; and/or 7) use of external BIOS debug strings stored separately from a system motherboard helps assure that hackers cannot reverse engineer using BIOS debug messages.

In one respect, disclosed herein is a method, including: retrieving and executing a system basic input/output system (BIOS) firmware from a first non-volatile storage that is integrated on a system motherboard of an information handling system together with at least one programmable integrated circuit; retrieving supplemental system BIOS component/s from a second non-volatile storage that is non-integrated and separate from the system motherboard, the supplemental system BIOS component/s being different from the system BIOS firmware; and executing the supplemental BIOS component/s together with the system BIOS firmware.

In another respect, disclosed herein is an information handling system, including: a system motherboard; at least one programmable integrated circuit integrated on the system motherboard; a first non-volatile storage integrated on the system motherboard and coupled to the at least one programmable integrated circuit, the first non-volatile storage storing a system basic input/output system (BIOS) firmware; and a second non-volatile storage that is non-integrated and separate from the system motherboard, the second non-volatile storage being coupled to the at least one programmable integrated circuit and storing supplemental system BIOS component/s that are different from the system BIOS firmware. The at least one programmable integrated circuit may be programmed to: retrieve the BIOS firmware from the first non-volatile storage that is integrated on the system motherboard, retrieve the supplemental system BIOS component/s from the second non-volatile storage that is non-integrated and separate from the system motherboard, and then execute the supplemental BIOS component/s together with the system BIOS firmware.

In another respect, disclosed herein is a method, including: removing supplemental BIOS component/s from a first BIOS firmware at a BIOS firmware build time, the remaining component/s of the first BIOS firmware forming a system BIOS firmware that does not include the removed supplemental BIOS component/s; and then storing the system BIOS firmware on a first non-volatile storage that is integrated on a system motherboard of an information handling system, and storing the removed supplemental BIOS component/s on a second non-volatile storage that is non-integrated and separate from the system motherboard of the information handling system.

BRIEF DESCRIPTION OF THE DRAWINGS

FIG. 11 illustrates generation of a pre-processed source file from a C source file according to one exemplary embodiment of the disclosed systems and methods.

DESCRIPTION OF ILLUSTRATIVE EMBODIMENTS

Figure 1:
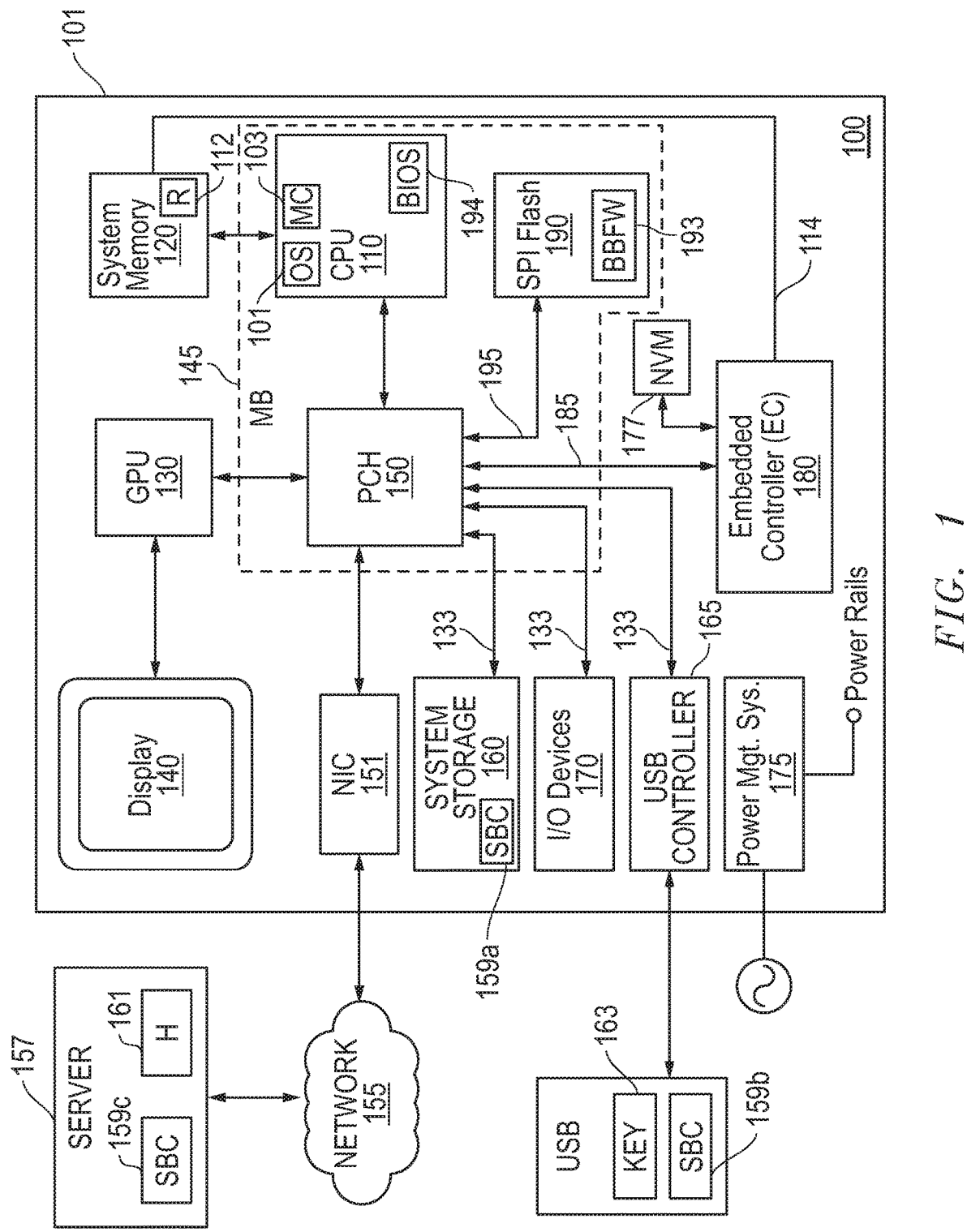
FIG. 1 is a block diagram of an information handling system according to one exemplary embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, information handling system 100 may generally include one or more host programmable integrated circuits, such as a central processing unit (CPU) 110, for executing an operating system (OS) 101 one or more user applications (not shown), etc. CPU 110 may also be configured to access SPI Flash 190 to load and boot the system BIOS 194 (e.g., UEFI) from base BIOS firmware 193 as shown. SPI Flash 140 may in one embodiment be a non-volatile storage device that is integrated on (e.g., soldered to) motherboard (MB) 145 of system 100 together with other integrated components of motherboard 145, such as CPU 110 and platform controller hub (PCH) 150.

CPU 110 may include any type of processing device, such as an Intel Pentium series processor, an Advanced Micro Devices (AMD) processor or another processing device. CPU 110 is coupled to system volatile memory 120, which may include, for example, random access memory (RAM), dynamic RAM (DRAM), synchronous DRAM (SDRAM). In one exemplary embodiment, system memory may be DRAM that is configured as dual in-line memory modules (DIMMs), and memory controller (MC) 103 may be present in CPU for managing the flow of data between CPU 110 and system volatile memory 120.

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub 150.

Platform controller hub (PCH) 150 controls certain data paths and manages information flow between components of the information handling system. As such, PCH 150 may include one or more integrated controllers or interfaces for controlling the data paths connecting PCH 150 with CPU 110, GPU 130, system storage 160, input/output (I/O) devices 170, embedded controller (EC) 180, embedded controller non-volatile memory storage (NVM) 177 (e.g., NVRAM, Flash memory, etc.), and SPI Flash memory storage device 190 where the base BIOS firmware image (e.g., BBFW 193) is stored. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Local system storage 160 (e.g., one or more media drives, such as hard disk drives, optical drives, NVRAM, Flash memory, solid state drives (SSDs), or any other suitable form of internal or external storage) is coupled to PCH 150 to provide permanent storage for information handling system 100. I/O devices 170 (e.g., a keyboard, mouse, touchpad, touchscreen, etc.) are coupled to PCH 150 to enable the user to interact with information handling system 100, and to interact with application programs or other software/firmware executing thereon.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

Embedded controller (EC) 180 is coupled to PCH 150 and may be configured to perform functions such as power/thermal system management, etc. EC 180 may also be configured to execute program instructions to boot information handling system 100, load application firmware from SPI Flash memory device 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, SPI Flash memory device 190 is a shared Flash memory device, which is connected to PCH 150 and EC 180. In such a configuration, PCH 150 provides EC 180 shared access to SPI Flash memory device 190 via eSPI bus 185, SPI bus 195 and various interface and logic blocks included within the PCH. One or more of the same or additional data communication bus/es 133 may be present to provide data communications through PCH 150 to and from system storage 160, I/O devices 170, and external USB Flash drive 135 via USB controller 165.

As shown in FIG. 1, base BIOS firmware 193 may be stored on SPI Flash memory device 190 of motherboard 145. As further shown, additional and separate supplemental BIOS components (SBC) 159 may be stored separately from base BIOS firmware 193 on non-volatile storage device/s that are external to (i.e., non-integrated with) motherboard 145. As just an example, in the embodiment of FIG. 1, separate supplemental BIOS component/s 159*a* are shown stored on system storage 160 (e.g., hard disk drive, solid-state drive, etc.), separate BIOS components 159*b* are shown stored on USB Flash drive 135, and separate supplemental BIOS component/s 159*c* are shown stored on non-volatile storage of a remote information handling system (e.g., such as a web server 157) that is accessed across network 155 (e.g., Internet, corporate intranet, etc.) by host CPU 110 via network interface controller (NIC) 151. It will be understood that only one storage source of separate BIOS components 159 may be coupled to system 100, although multiple such sources 159 may also be provided.

In one embodiment, base BIOS firmware 193 on motherboard-attached SPI Flash memory device 190 may be a non-debug mode BIOS firmware (i.e., BIOS code having no debug mode option presented to a system user) from which all debug messages have been extracted and separately stored as separate supplemental BIOS components 159*a*, 159*b* and/or 159*c*. In such an embodiment, base BIOS firmware 193 may include BIOS firmware programming components such as code to: look for a hotkey, download and authenticate an offline indexed BIOS debug string file if debugging was enabled via a designated hotkey, find an indexed string, and send it to a debug interface like a serial port. If the designated hotkey was never pressed, BIOS will call a debug message display routine, passing in an index to the file, but the routine will see that debug mode is disabled and simply return without doing anything. Other functionality would be identical to a standard non-debug mode BIOS.

In one embodiment, the data storage capacity of SPI Flash memory device 190 may be greater than or equal to the data size of base BIOS firmware 193 such that it is sufficient to store the data size of base BIOS firmware 193, but at the same time the data storage capacity of SPI Flash memory device 190 may be less than the combined data size of base BIOS firmware 193 with either one or both of separate BIOS components 159*a*, 159*b* and/or 159*c* such that it cannot store both base BIOS firmware 193 together with either one or both of BIOS components 159*a*, 159*b* and/or 159*c*. For example, SPI Flash memory device 190 may have a maximum data capacity of 16 MB and base BIOS firmware 193 stored thereon may have a data size of less than or equal to 16 MB, while the combined total data size of base BIOS firmware 193 and separate BIOS components 159*a*, 159*b* and/or 159*c* is greater than 16 MB (e.g., such as 24 MB or 32 MB). It will be understood that these data sizes are exemplary only, and that SPI Flash memory device 190 may have a data capacity of greater or lesser than 16 MB in other embodiments, and that data sizes of base BIOS firmware 193 and separate BIOS components 159*a*, 159*b* and/or 159*c* may be individually greater or lesser than the respective data size examples given above.

However, it will be understood that in other embodiments base BIOS firmware 193 may be a debug mode BIOS firmware (i.e., having a debug mode option presented to a system user, etc. that contains default BIOS debug messages such as BIOS status codes, and BIOS error messages, etc.), while separate supplemental BIOS components 159*a*, 159*b* and/or 159*c* may include BIOS debug strings corresponding to supplemental (e.g., customized) BIOS debug messages, e.g., such as very verbose logs of the boot process showing a very high level of detail of the boot progress, etc. Other examples of possible supplemental BIOS components 159 include, but are not limited to, debugger firmware, UEFI drivers, etc.

It will be understood that in other embodiments separate supplemental BIOS components 159*a*, 159*b* and/or 159*c* may include types of BIOS programming other than BIOS debug strings corresponding to individual BIOS debug messages. Examples of such other types of BIOS programming include, but are not limited to, debugger firmware, UEFI drivers, etc. In such embodiments, base BIOS firmware 193 may be either debug mode or non-debug mode BIOS firmware, with the separate BIOS components 159*a*, 159*b* and/or 159*c* providing additional features and/or functionality to the base BIOS firmware 193 when loaded and executed by CPU 110. For example, a separate supplemental BIOS component 159 may be a debugger firmware that provides an interface to allow the information handling system user to step through firmware instructions or change memory or PCIE register contents before the information handling system (e.g., computer) boots. In another example, a separate supplemental BIOS component 159 may be a UEFI driver that adds BIOS functionality like booting to a new type of storage device, or that customizes BIOS behavior to suit needs of a particular information handling system user, such as supporting an external PCIE card chassis.

Figure 2:
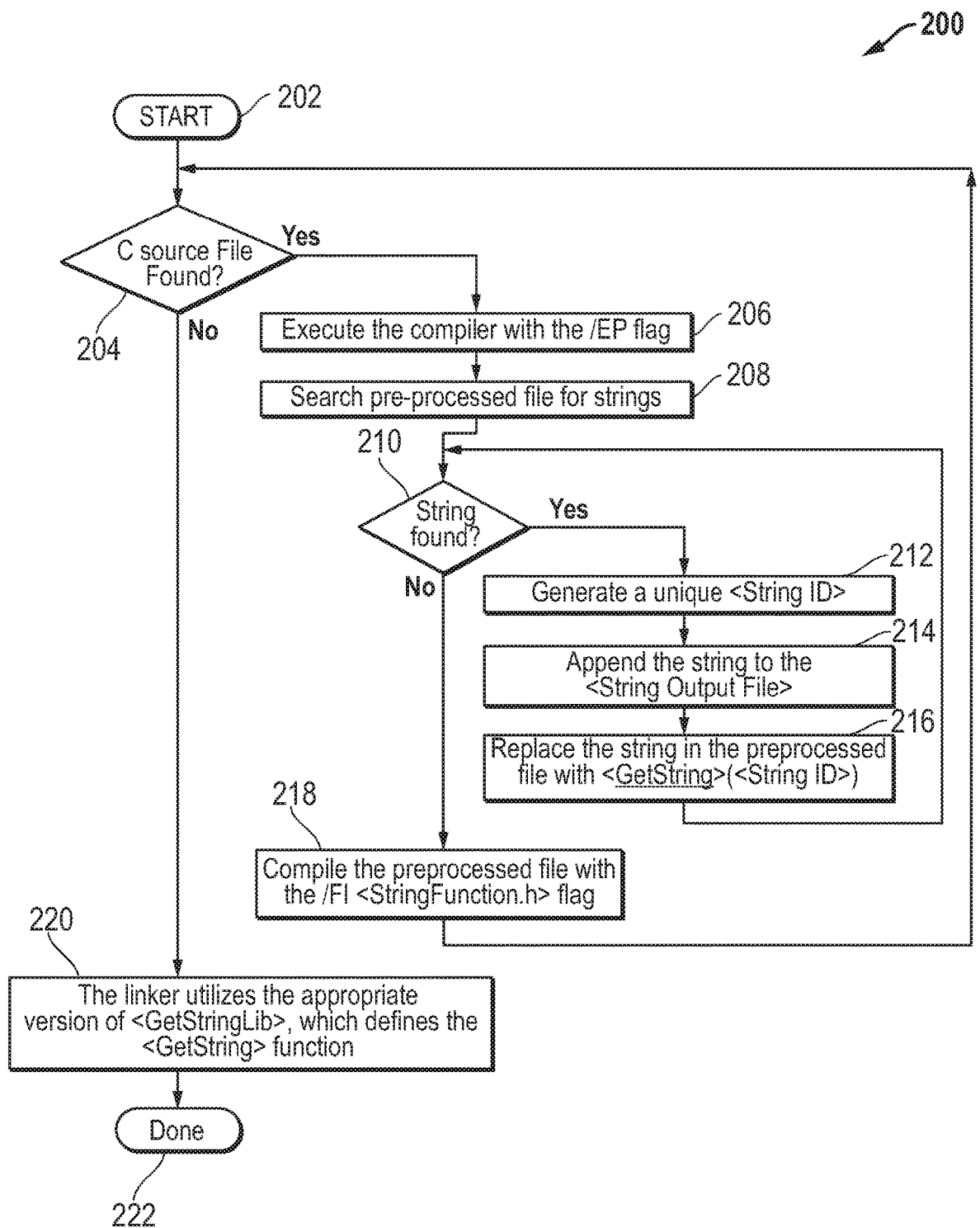
FIG. 2 illustrates a process flow according to one exemplary embodiment of the disclosed systems and methods.

FIG. 2 illustrates an exemplary embodiment of build module or library process flow 200 that may be implemented during BIOS firmware build time by a programmable integrated circuit (e.g., of a manufacturing factory programming system or a system assembly programming system) to create external BIOS debug strings by extracting and moving debug messages out of the firmware source code and the compiled binary images, and into a separate BIOS debug string database, external to an information handling system platform. In one embodiment, BIOS debug strings may be moved from all platform BIOS firmware together with code of separately compiled UEFI feature modules to a formatted, encrypted external file. As will be described below, during the BIOS firmware build process, BIOS debug strings may be replaced in the source code with a debug string index (as referred to herein as a String ID). The process flow 200 of FIG. 2 may be executed during the BIOS firmware build process, for example, prior to or during system assembly at a factory assembly plant for an information handling system 100.

FIG. 2 begins in step 202 and then moves to step 204 where it is determined whether a C source file (i.e., file that contains an executable debug module together with ASCII debug message statement/s) exists in the BIOS firmware source code. If such a C source file is found, then a file compile is executed in step 206 with a /EP flag for the located C source file. In this embodiment, the /EP flag is a pre-process directive which does not actually compile the current C source file in step 206. Rather, the /EP flag causes generation of an intermediate pre-processed source file in step 206 by removing comments, resolving all included files and replacing all preprocessor directives, macros, and constants in the C source file with their final value to create BIOS debug strings in the current pre-processed source file corresponding to respective BIOS debug messages of the C source file. This is illustrated in the example embodiment of FIG. 11, where a pre-processed source file 1104 is generated from a C source file 1102.

Next, in step 208, the current pre-processed source file of step 206 is searched for BIOS debug strings in an iterative manner as follows. When each existing BIOS debug string of the current pre-processed source file is located in step 210, then process flow 200 proceeds to step 212 where a unique BIOS debug string index or BIOS debug string identifier (<String ID>) is generated and assigned to the particular located BIOS debug string of the current iteration. In one embodiment, <String ID> may contain sufficient information (e.g., message file name and byte offset within file) to reduce future search time for the particular BIOS debug string.

Next, in step 214, the ASCII text of the current BIOS debug string from steps 210 and 212 is appended and saved to a separate external BIOS debug string output file (<String Output File>), and then in step 216 the ASCII text of the current BIOS debug string of the current pre-processed source file is replaced with <GetString>(<String ID>) of step 212, e.g., the ASCII text of the current BIOS debug string is removed from the current pre-processed source file 1104 and replaced with unique BIOS debug string identifier (ID) (e.g., numeric, alphanumeric, etc.) in the modified pre-processed source file 1106 as illustrated in the example of FIG. 11. The following sequence may be employed in one exemplary embodiment as each .EFI module is built: A) The GUID of the .EFI module is appended to the external BIOS debug string output file (<String Output File>); B) The number of debug messages is counted, and a file offset array is allocated in the file; C) Every time a message is found, the index for that message number points to the next available file position; and D) All BIOS debug messages may be assigned a BIOS debug string number starting at 0, or using other unique numbering or alphanumeric system that assigns a unique BIOS debug string ID corresponding to each BIOS debug message.

In one embodiment, a BIOS debug table (e.g., lookup table) may be iteratively built as each BIOS debug string is extracted and appended to the separate external BIOS debug string output file (<String Output File>) and a BIOS debug string ID (e.g., unique number, unique alphanumeric character/s, etc.) is assigned to that extracted BIOS debug string. Such a BIOS debug table may be built to correlate each assigned BIOS debug string identifier to the identifier of the ASCII text of its corresponding BIOS debug message, and the completed BIOS debug table may be included with the corresponding BIOS debug strings in an external BIOS debug string output file (<String Output File>) 159 and employed as described herein.

Step 216 then returns to step 210, where it is determined whether another BIOS debug string remains in the pre-processed source file of step 206. If so, then steps 212 to 216 are repeated again for the next located BIOS debug string, and repeats as many times as necessary until all BIOS debug strings of the pre-processed source file have been appended and saved to the separate external BIOS debug string output file<String output File> and replaced with respective unique<String ID> values in the current pre-processed source file.

When all BIOS debug messages of the preprocessed source file have been replaced with respective<GetString>(<String ID>) values in iterative steps 210 to 216, then no BIOS debug strings are found in step 210 and process flow 200 proceeds to step 218. In step 218, the current pre-processed source file is compiled with the /FI<StringFunction.h> flag, with <StringFunction.h> containing the necessary prototypes for a<GetString> external function. In one embodiment, the Forced Include flag (/FI) may be used to ensure that every C source has the prototype for "CHAR8* __cdecl GetStringById(UINT32 StringId)" as shown in FIG. 11. In such an embodiment, the /FI option may employed where the prototype is not explicitly inserted into the preprocessed source file, e.g., the /FI option may be used as an alternative mechanism to ensure the prototype is available to all C-source. Step 218 then returns to step 204, where it is determined whether another C source file remains in the BIOS firmware source code.

If another C source file is found to remain in the BIOS firmware source code in the next iteration of step 204, then steps 206 to 216 are repeated again for the next located C source file. Steps 204 to 216 repeat in this manner as many times as necessary until all C source files of the BIOS firmware source code have been located, pre-processed and compiled in the manner described above. At this time, no further C source files will be found in step 204, and process flow 200 will proceed to step 220 where all compiled C source files are linked together (e.g., using linker logic) using the appropriate version of <GetStringLib>, which defines the <GetString> function (e.g., 32 bit<GetString>, 64 bit<GetString>) of step 216. Methodology 200 then ends in step 222.

Figure 3:
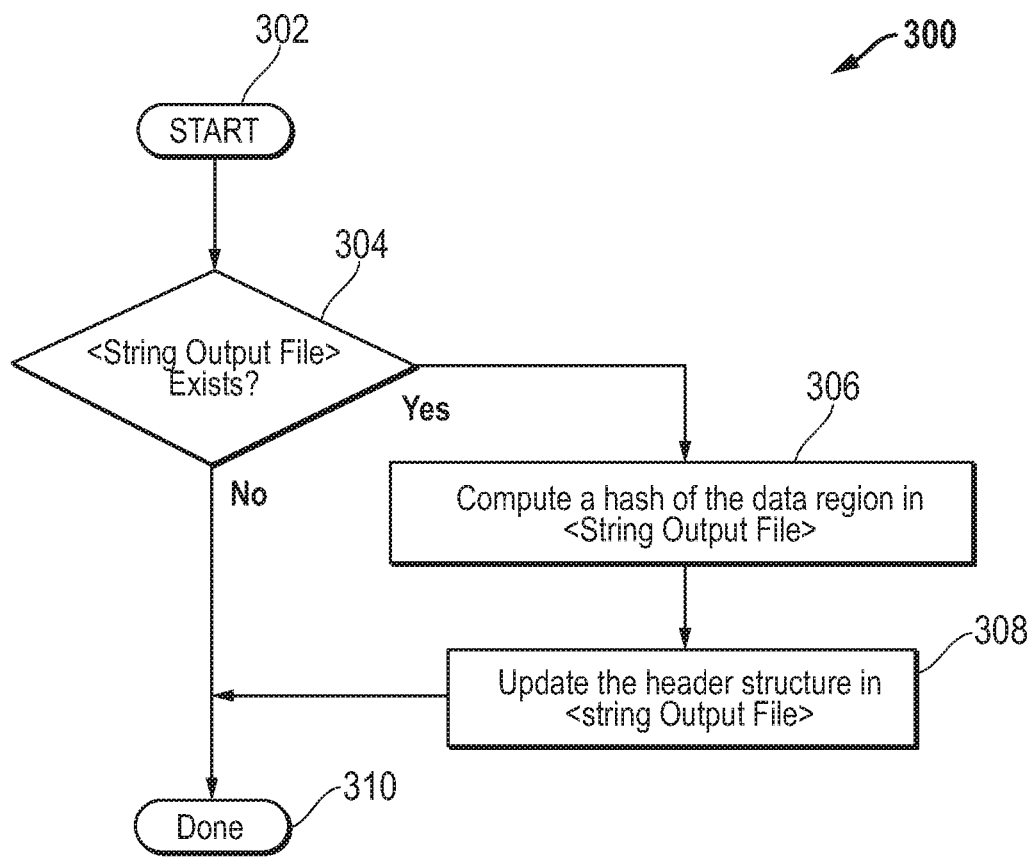
FIG. 3 illustrates a process flow according to one exemplary embodiment of the disclosed systems and methods.

FIG. 3 illustrates an exemplary embodiment of post-build process flow 300 that may be implemented by a programmable integrated circuit (e.g., of a factory programming system) following the steps of process flow 200 of FIG. 2. As shown, methodology of flow 300 starts in step 302, and proceeds to step 304 where it is determined if a separate external BIOS debug string output file (<String Output File>) exists in memory accessible by the programmable integrated circuit. If not, then process flow 300 terminates in step 310. However, if an external BIOS debug string output file (<String Output File>) is found in step 302, then a hash of the data region contained in the <String Output File> is computed in step 306, and the header structure in the external BIOS debug string output file (<String Output File>) updated in step 308, e.g., with the BIOS revision (version), calculated hash from step 306, and file length. Process flow 300 then terminates in step 310.

Following is one exemplary embodiment of pre-processor BIOS build flow and post-build process flow that may be implemented according to the methodology of FIGS. 2 and 3:

1) Set the number of debug messages to zero.
2) Set the current debug message to zero.
3) Open an empty file called DEBUG_FILE_LIST.TXT.
4) Read all source code files, and for every debug message found, increment the number of debug messages.
5) For each file containing a debug message, append the filepath to DEBUG_FILE_LIST.TXT.
6) Open an empty file called EXTERNAL_DEBUG_MESSAGES.BIN.
   a) The first 32 bytes of this file will be allocated to security signature information.
   b) 4 bytes times the number of debug messages will be assigned to the message index data structure.
7) For each filepath in DEBUG_FILE_LIST.TXT
   a) Find a debug message.
   b) Replace the call to dump an inline debug message with a call that passes in a 32 bit message number.
   c) Pass in the value of the current debug message number.
   d) Save the current of end EXTERNAL_DEBUG_MESSAGES.BIN to End_Of_File.
   e) Write End_Of_File value into the index for the current debug message.
   f) Write the message length to the 16 bit field at the End_Of_File.
   g) Write the actual message starting at End_Of_File+2
   h) Increment the current debug message number.
   i) Add message length+2 to the End_Of_File.
   j) Repeat for all messages in the file.
8) Calculate a hash for EXTERNAL_DEBUG_MESSAGES.BIN, starting at offset 32 and continuing until End_Of_File.
9) Write the BIOS revision number to the 32 byte header.
10) Write the Hash to the 32 byte header.
11) Write the file length to the 32 byte header.

In one embodiment, all the separate BIOS debug strings may be extracted from the pre-processed source files of the BIOS firmware source code and appended as described above to an external BIOS debug string output file (<String Output File>) that in one embodiment may be a formatted, encrypted external file. In this regard, BIOS debug messages may be copied as BIOS debug strings together with a corresponding BIOS debug table to a special name formatted .UNI file, e.g., X_DBG [build module name].uni, or X_DBG [DPF_name].uni for DPF files which would be part of a public production package (with "X" being a manufacturer identifier). At the build time .UNI files may be used to generate an external BIOS debug string database and a .h file containing the # defines ENUMs for the String IDs. These files may be stored as <StringOutputFile>, for example, as supplemental BIOS code (SBC) 159*a* or 159*b* on local non-volatile storage component/s coupled to system 100, or as SBC 159*c* on a web server that is separate and remote from system 100.

In one embodiment, during the BIOS build project all BIOS debug message macros may be changed in the source code such that BIOS behavior varies depending on the relative size of system SPI Flash memory 190 upon which the BIOS is built to be installed, e.g., such that legacy debug message behavior occurs (i.e., messages are built into the BIOS and not copied to an external file) when the system BIOS code is built to be stored on a 32 megabyte SPI Flash memory device 190, but such that the debug message macro passes the .EFI file GUID and a BIOS debug string ID within the .EFI file to code that extracts the string from an external<StringOutputFile> file 159 when the system BIOS code is built to be stored on a smaller 16 megabyte SPI Flash memory device 190. Further, when the BIOS is built as a 16 megabyte debug BIOS, then provision for external BIOS debug string support from the external<StringOutputFile> file 159 may always be enabled.

Exemplary embodiments for serial outing BIOS debug strings include:
  Option1: Serial out debug string IDs
    Modify debug macros to output string IDs ENUM instead of the strings
    A POST processor will then convert the ENUMs to the actual strings
    Fast serial debug outs as no long strings are outputted
  Option2: Reconstruct strings
    Load the external strings database in BIOS
    A lookup function (e.g., lookup table) will convert the ENUM into string before outputting In another embodiment, provision may be made to allow external BIOS message support (from an external<StringOutputFile> file 159) to be selectively enabled and disabled via a sticky hotkey. For example, BIOS 194 may be programmed to operate such that a user input (e.g., key press) from a designated "start debug support" hotkey upon system power up causes a 16 megabyte release (non-debug) mode BIOS to behave exactly like a debug mode BIOS, while user input (e.g., key press) from a designated "stop debug support" hotkey upon system power up causes the 16 megabyte BIOS to revert back to a release (non-debug) mode system BIOS behavior. Further information on such an embodiment is further described herein in relation to FIGS. 4, 5 and 6.

Figure 4:
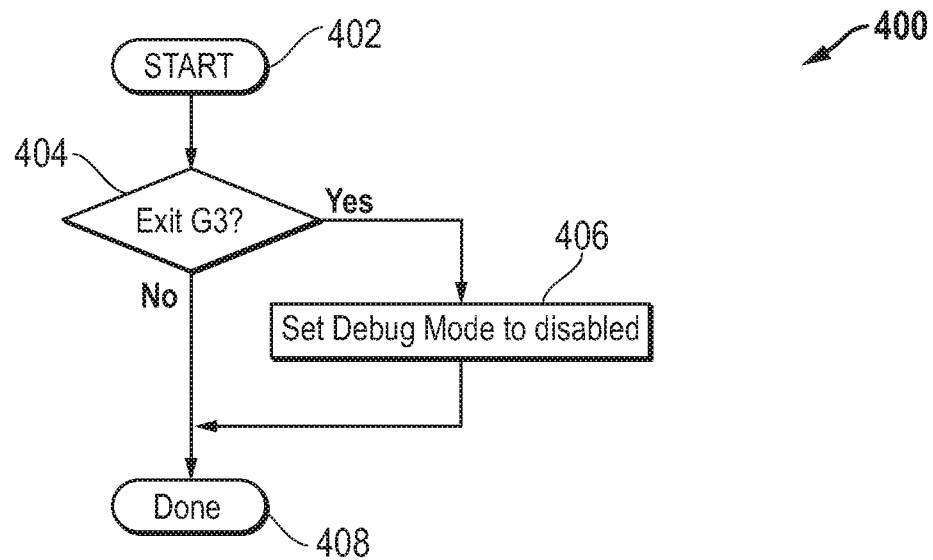
FIG. 4 illustrates a process flow according to one exemplary embodiment of the disclosed systems and methods.
Figure 5:
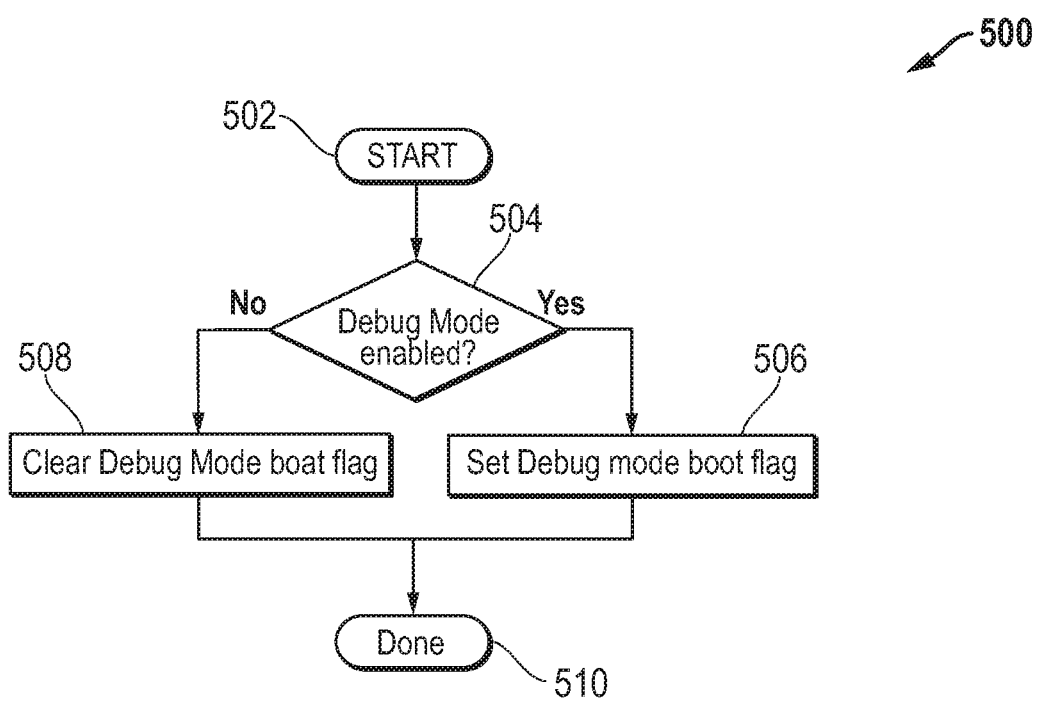
FIG. 5 illustrates a process flow according to one exemplary embodiment of the disclosed systems and methods.

FIGS. 4 and 5 illustrate exemplary embodiments of respective power on logic flow 400 and update boot flags logic flow 500 that may be implemented (e.g., by EC 180) to determine whether or not to reset the operational status of system BIOS 194 to a default non-debug mode upon a cold boot of system 100. In particular, power on logic 400 of FIG. 4 starts in step 402 upon system power on or other cold boot operation and moves to step 404 where it is determined whether or not the system is exiting Advanced Configuration and Power Interface (ACPI) G3 state. If the system is not exiting G3 (mechanical off) state, then process flow 400 terminates in step 408 without setting any change to the current system BIOS debug mode status. However, if the system 100 is determined in step 404 to be exiting G3 state, then process flow 400 proceeds to step 406 where state of BIOS debug mode is set to be disabled. Process flow 400 then terminates in step 408.

Next, an update boot flags logic flow 500 begins in step 504 where it is determined whether state of BIOS debug mode is enabled. If so, then a BIOS debug mode boot flag is set (e.g., in NVM memory 177) in step 506, and process flow 500 then terminates in step 510. However, if BIOS debug mode is not found enabled in step 504, then any pre-existing debug mode boot flag is cleared in step 508 before process flow 500 terminates in step 510.

Figure 6:
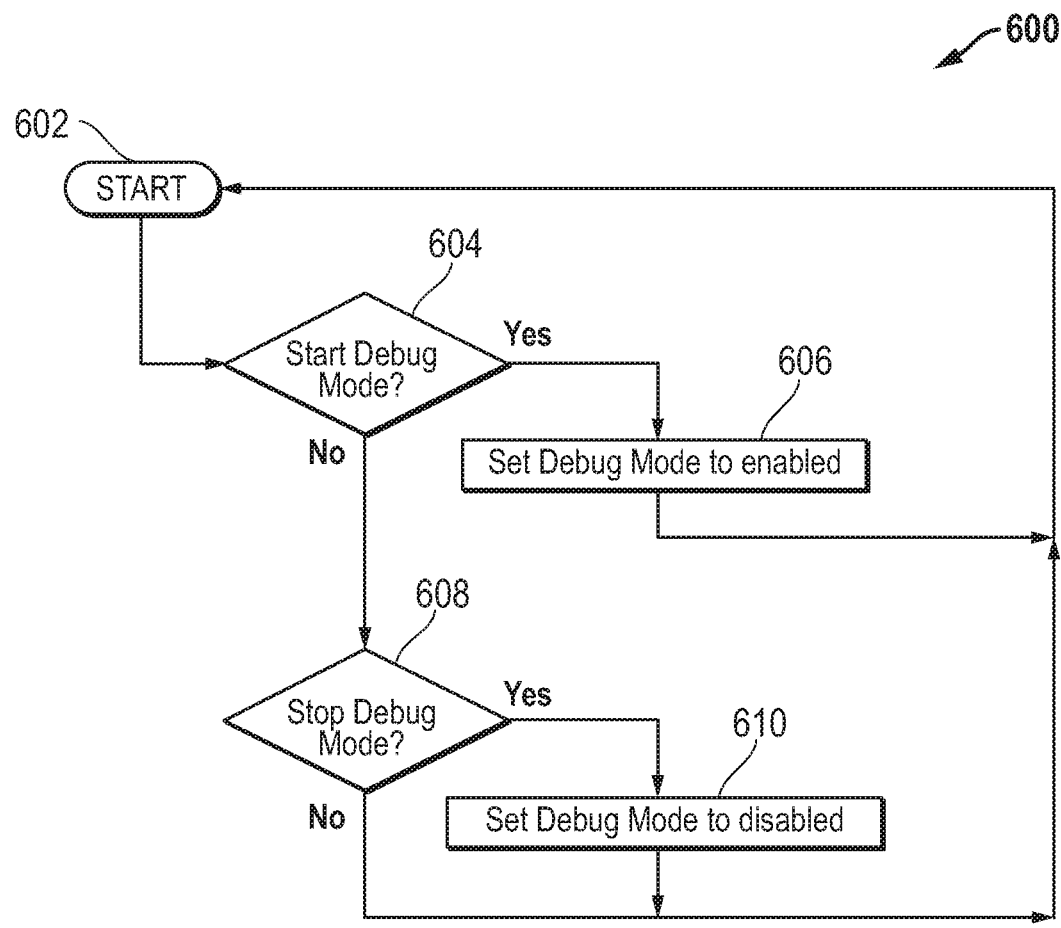
FIG. 6 illustrates a process flow according to one exemplary embodiment of the disclosed systems and methods.

FIG. 6 illustrates one exemplary embodiment of process hot key logic flow 600 that may be implemented (e.g., by EC 180) during system pre-boot or any other time for handling two different types of debug hotkey inputs, i.e., start debug mode hotkey and stop debug mode hotkey inputs received from a human user of system 100. Such debug hotkey inputs may be entered via I/O device/s 170 by the user concurrent to actuation of a system power button (or other power-on signal). Examples of types of user hotkey input actions that may be employed include, but are not limited to, a user pressing or otherwise actuating a designated start debug mode key or a designated stop debug mode key on a keyboard or a touchscreen, a user simultaneously or sequentially actuating multiple keyboard or touchscreen keys that correspond to a start debug mode or a stop debug mode, etc. Although hotkey logic flow 600 may be only enabled during pre-boot, it is alternatively possible to enable hotkey logic flow 600 at any time including during system operation (e.g., during system runtime). In the latter case, it may be desirable to designate a hotkey input combination that is complex enough to prevent accidental and unintended hotkey input by a human user during normal use.

As shown, process flow 600 starts in step 602 and then moves to step 604 where it is determined whether or not a start debug mode hotkey, start_debug_support (e.g., designated Function key, multi-key combination, etc.) has been actuated by a user concurrent with input of a system power-on signal (e.g., such as pressing of a mechanical power button). If so, then process flow 600 moves to step 606 where a BIOS debug mode flag is set in EC Bootflag region (e.g., file) in system non-volatile storage (such as NVM 177 as soon as NVM writing is available) for all subsequent system boots (i.e., the hotkey is sticky). At the time of step 606, EC 180 may also signal host CPU 110 to initiate an optional security exchange (via manufacture authentication file or server as described further herein in FIG. 10) for packet signature verification and decryption prior to allowing setting of the BIOS debug mode flag in EC Bootflag. In such an optional embodiment, host CPU 110 may message the EC 177 if host CPU 110 determines the signature verification and decryption is valid, and host CPU 100 may send the status and a "Debug Token" to EC 177, which is used by EC 177 in this case to unlock the system platform 100 and fully enable the debug mode flag feature. However, if such signature verification fails, then EC 177 responds by disabling the BIOS debug mode feature in a manner similar to step 610 described below.

However, if no start debug mode hotkey (start_debug_support) was found actuated in step 604, then it is determined in step 608 whether or not a stop debug mode hotkey, stop_debug_support (e.g., designated Function key, multi-key combination, etc.) has been actuated by a user during the current system pre-boot operation. If so, then process flow 600 then moves to step 610 where any currently existing BIOS debug mode flag set in EC Bootflag regions of NVM 177 or other system non-volatile storage is erased or otherwise disabled or cleared for all subsequent system boots. Process flow 600 then returns to step 602 and repeats to monitor for user hotkey actuation. If no user stop_debug_support hotkey actuation is detected in step 608, then process flow 600 returns to step 602 and repeats to monitor for user hotkey actuation without making any change to existing BIOS debug flag status in EC Bootflag region of NVM 177.

Following is one exemplary embodiment of embedded controller process flow that may be implemented according to the process flow of FIG. 6:

1) Upon power up, the embedded controller watches for 2 hotkeys:
   a) Start Debug Mode
   b) Stop Debug Mode
2) If Start Debug Mode is hit upon power up, a flag called DEBUG_MODE is set to 1. DEBUG_MODE is sticky across warm boots and cold boots, but is cleared upon entering the G3 ACPI power state.
3) If the Stop Debug Mode hotkey is pressed upon power up, the DEBUG_MODE flag is restored to its default value of zero (meaning debug is disabled).
4) When the computer is booted, the embedded controller passes the state of the DEBUG_MODE flag to the system BIOS via the Boot Flags variable.

Figure 7:
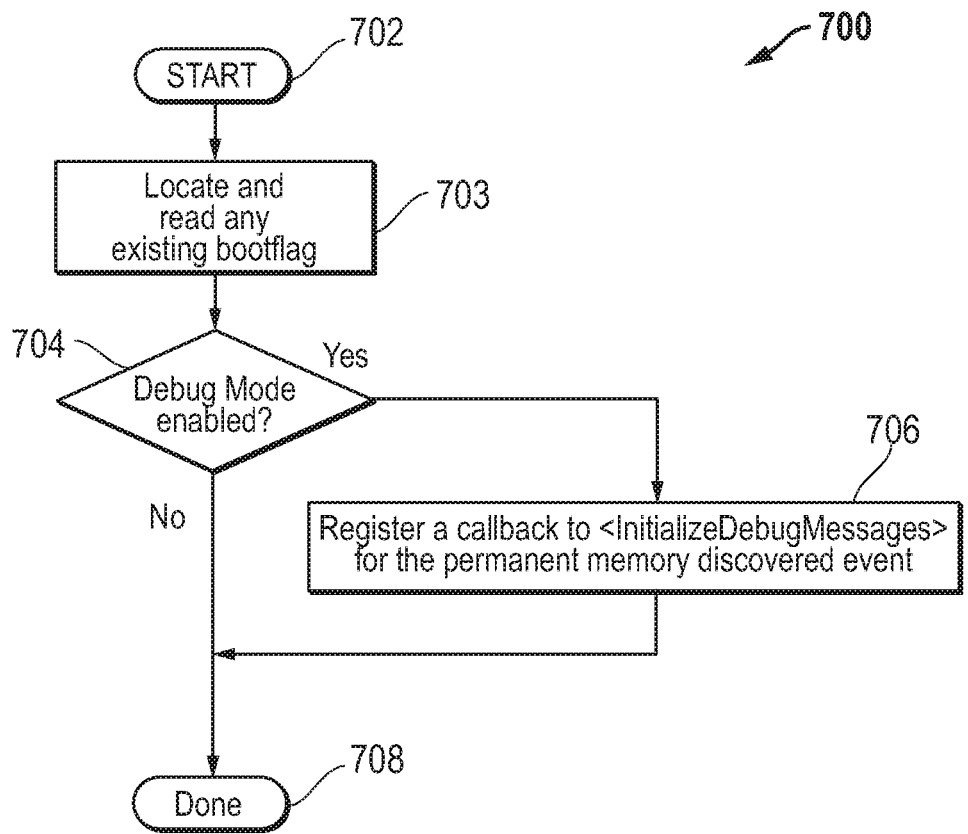
FIG. 7 illustrates a process flow according to one exemplary embodiment of the disclosed systems and methods.

FIG. 7 illustrates one exemplary embodiment of read boot flags process flow 700 that may be implemented (e.g., by BIOS 194 executing on Host CPU 110) during a current boot of system 100 to detect and read any existing BIOS debug mode flag that exists in EC Bootflag region of NVM 177 or other system non-volatile storage of system 100. As shown, process flow 700 starts in step 702 and moves to step 703 where system BIOS 194 may find the EC Bootflag region (e.g., file) of NVM 177 and read the EC Bootflag variable within the EC Bootflag region, store this EC Bootflag variable in EC NVM 177, and initialize random access memory of system volatile memory 120. Then in step 704, system BIOS determines whether BIOS debug mode is enabled from the state of the EC Bootflag debug mode bit variable, e.g., BIOS debug mode flag is set to "1" to enable BIOS debug mode. If BIOS debug mode is found not enabled in step 704, then process flow 700 terminates in step 708. However, if BIOS debug mode is found enabled in step 704, then system BIOS 194 may register a callback to <IntializeDebugMessages> in step 706 to initialize the USB controller 165 to look for a USB key 163 on a root port as further described in relation to FIG. 8 before process flow 700 terminates in step 708.

Figure 8:
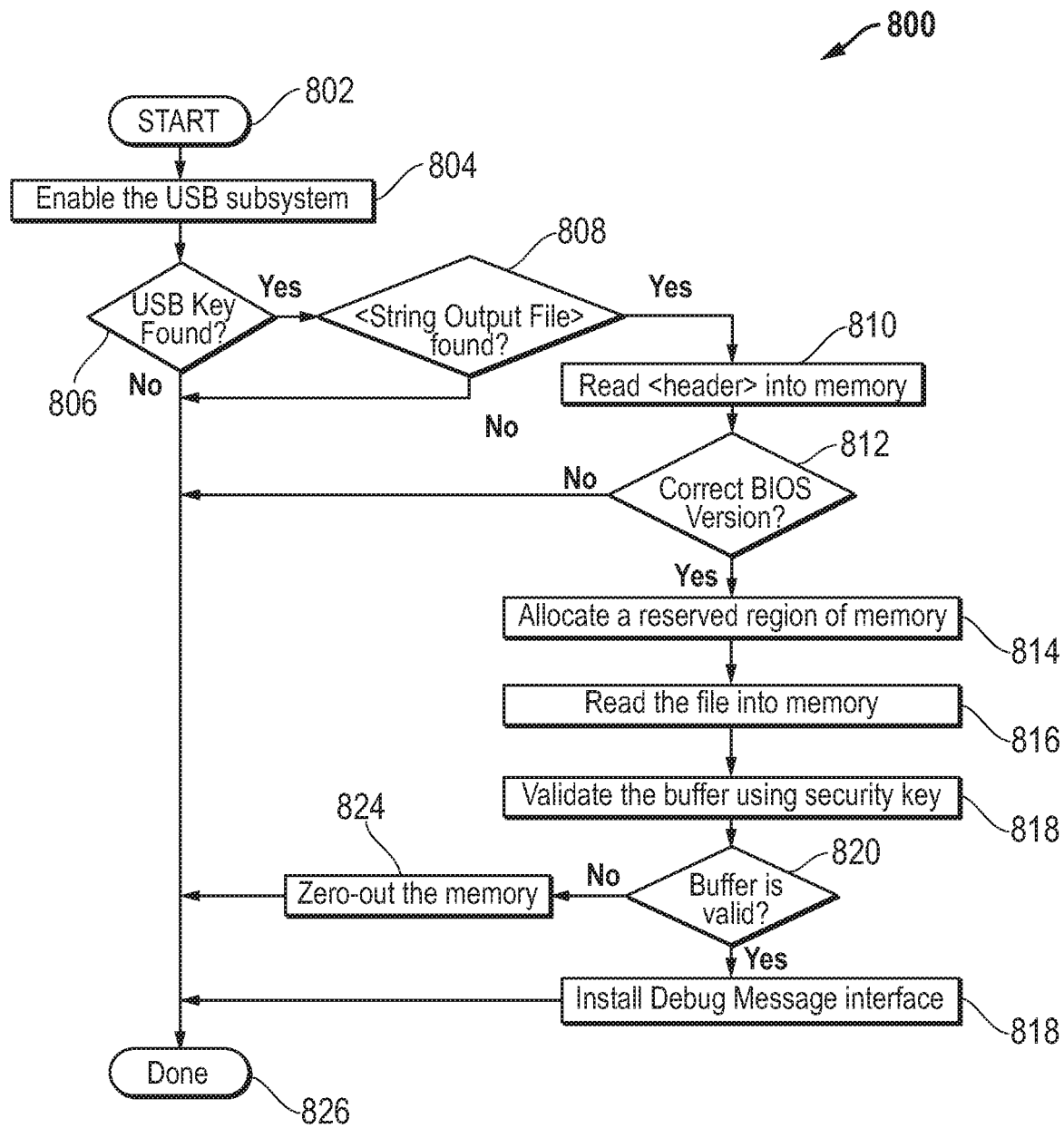
FIG. 8 illustrates a process flow according to one exemplary embodiment of the disclosed systems and methods.

FIG. 8 illustrates one exemplary embodiment of initialize debug messages process flow 800 that may be implemented by system BIOS 194 in response to determination of BIOS debug mode enablement (EC Bootflag Debug mode bit set) and callback to <IntializeDebugMessages> of step 706 of FIG. 7. Process flow 800 starts in step 802 to implement<IntializeDebugMessages> by enabling the USB subsystem to initialize the USB controller 165 and look for a USB key on a USB root port, such as may be coupled to USB Flash drive 135 or other USB device of system 100. In one embodiment, an unencrypted version of the message file may be created at BIOS build time. The encrypted version on the file would be created using details provided by the system under test as salting data. The end user may then download the resulting file to a USB key.

If no USB key is found, then process flow 800 terminates in step 826. However, if a USB key 163 is found in step 802, then system BIOS 194 searches for an external BIOS debug string<StringOutputFile> file 159 (e.g., from FIGS. 2 and 3) on non-volatile storage (e.g., 159a, 159b, or 159c) of system 100. If no such file is found, then process flow 800 terminates in step 826.

However, if an external BIOS debug string<StringOutputFile> file 159 is found in step 808, then in step 810 system BIOS 194 reads a header (<header>) of the external BIOS debug string<StringOutputFile> file 159 (e.g., from FIG. 3) into system volatile memory 120, and then compares information from the <header> (e.g., such as BIOS version) to determine in step 812 if the current system BIOS version 194 is correct for (corresponds to) the version of the located external BIOS debug string<StringOutputFile> file 159. For example, a correct BIOS version for an external BIOS debug string<StringOutputFile> file 159 would be a non-debug "release" mode BIOS version of the same BIOS revision from which debug messages have been removed and stored in external BIOS debug string<StringOutputFile> file 159. If not, then process flow 800 terminates in step 826. However, if the version of current system BIOS 194 corresponds to the version of BIOS debug string<StringOutputFile> file 159, then the process flow proceeds to step 814 where system BIOS 194 allocates a reserved region 112 of system volatile memory 120 that is readable from all execution contexts. In step 816, system BIOS 194 then reads the located external BIOS debug string<StringOutputFile> file 159 into this reserved region 112 of system volatile memory 120.

Next, in step 818, the buffer (i.e., BIOS debug string<StringOutputFile> file 159 loaded into reserved region of system volatile memory 120) is validated by system BIOS 194 using the USB security key of step 806 compared to the hash of header (<header>) of the external BIOS debug string<StringOutputFile> file 159 (e.g., that was calculated and added to the header in steps 306 and 308 of FIG. 3). If the BIOS debug string<StringOutputFile> file 159 is not validated in step 818, then the external BIOS debug string<StringOutputFile> file 159 and its header<header> is removed from system volatile memory 120 before the process flow 800 terminates in step 826.

Figure 9:
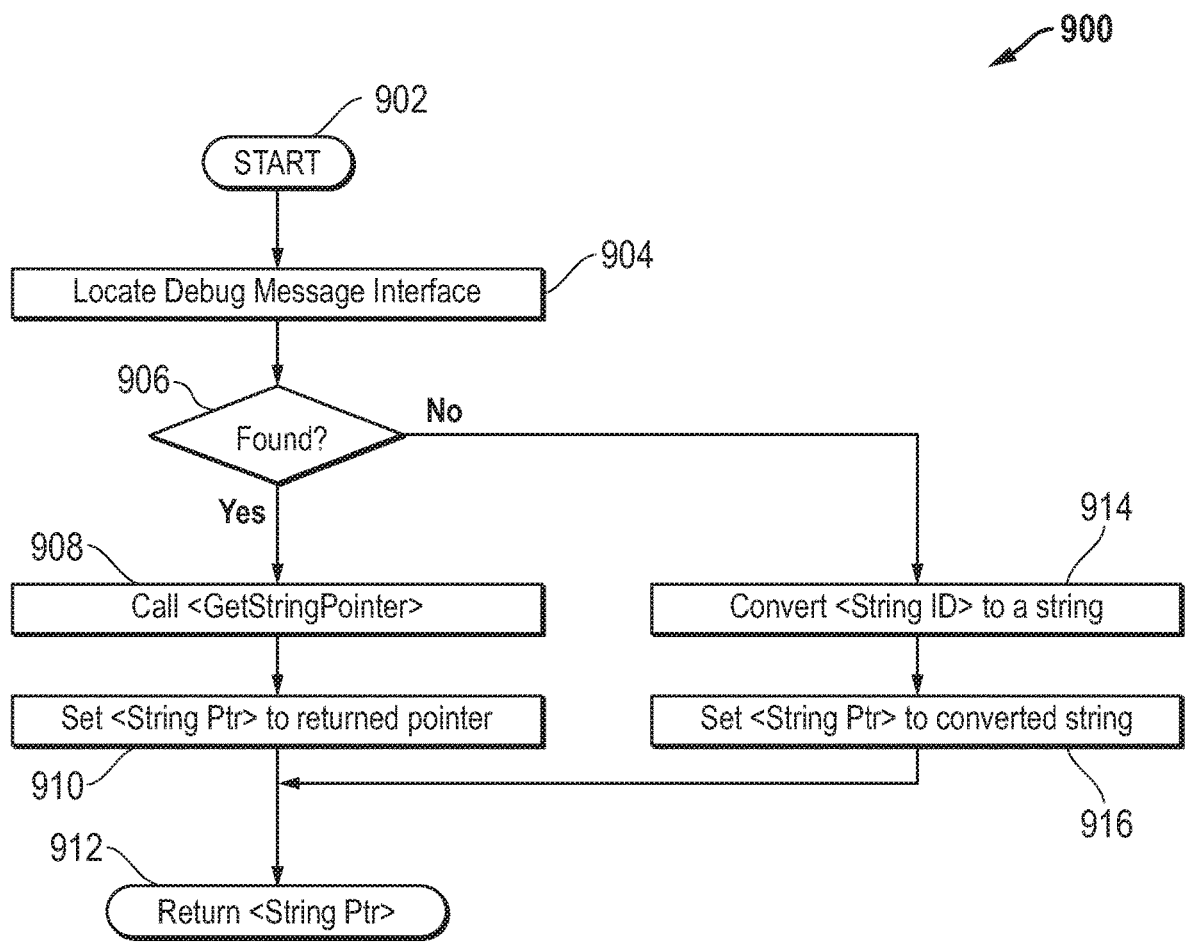
FIG. 9 illustrates a process flow according to one exemplary embodiment of the disclosed systems and methods.

However, if the BIOS debug string<StringOutputFile> file 159 is found valid, then process flow 800 proceeds to step 822 and installs the debug message interface as further illustrated and described in relation to FIG. 9. Process flow 800 the terminates in step 826.

Following is one exemplary embodiment of system BIOS process flow that may be implemented according to the process flow of FIGS. 7 and 8:
1) When the BIOS first initializes, it reads the Boot Flag variable from the embedded controller.
2) If the DEBUG_MODE bit in the Boot Flag variable is zero, the system boots normally.
3) If the DEBUG_MODE bit in the Boot Flag variable is one, the system will:
   a) Immediately after memory reference code completes:
      1) Enable USB subsystem.
      2) Find a USB key.
      3) Search for a file called EXTERNAL_DEBUG_MESSAGES.BIN in the root directory.
      4) Read the 32 byte header from the file
      5) Read the BIOS revision from the 32 byte header. If it does not match the current BIOS then exit.
      6) Read the file length from the 32 byte header.
      7) Allocate a buffer of file length in memory that will be accessible from UEFI PEI, DXE, and SMM modes.
      8) Read the entire file into the allocated buffer.
      9) Validate the buffer using a key known only to the BIOS.
      10) If the buffer is invalid, zero out the buffer and clear the DEBUG_MODE flag.

FIG. 9 illustrates one exemplary embodiment of <GetString> logic process flow 900 that may be implemented by system BIOS 194 in response to install debug message interface of step 822 of FIG. 8. Process flow starts in step 902 and searches for debug message interface in step 904 in the following location/s: a debug message interface may be installed by installing the existing UEFI protocol for parsing the message file. If the debug protocol is missing, the BIOS generates a string consisting of the string ID (e.g., number, alphanumeric, etc.) that was intended to be sent to the debug output device. If debug message interface is not found in step 906, then process flow 900 proceeds to step 914 where <String ID> is converted to a string in step 914, and <StringPtr> is set to a converted string in step 916 before process flow proceeds to return<StringPtr> in step 912. On the other hand, if a debug message interface is found in step 906, then<GetStringPointer> is called in step 908 to search for the <String ID> and return a pointer.<StringPtr> is then set to the returned pointer in step 910, and returned in step 912. As an example of the above methodology, if message 6 is "This is a test.", and the debug message interface is installed, the message sent to the serial port would be "This is a test." If the debug message interface is not installed, the message would be "String ID 6".

In one exemplary embodiment, the process flow 800 of FIG. 8 may be implemented with an optional security process flow that must be executed successfully (i.e., authentication succeeds) before allowing data of an external BIOS debug string output file (<String Output File>) 159 to be loaded into system volatile memory 120 of system 100, e.g., such as in step 816 of FIG. 8. In one embodiment, such a security process flow may include using host processing device 161 of network server 157 to authenticate the system platform 100 (e.g., using a separate process that unlocks factory options on the system platform 100) then to prepare a debug packet file that includes the external BIOS debug string output file (<String Output File>) 159 at the server 157 only if the platform 100 is authenticated. The server 157 may provide the debug packet file as a payload to the platform 100, which in turn authenticates the debug packet file before launching the BIOS debug code. In a further embodiment, such a security process flow may only be required if the current BIOS version is determined in step 812 to be a non-debug mode release version of BIOS but not if the current BIOS version is determine in step 812 to be a debug mode BIOS (in which case no decryption or signing is required).

Figure 10:
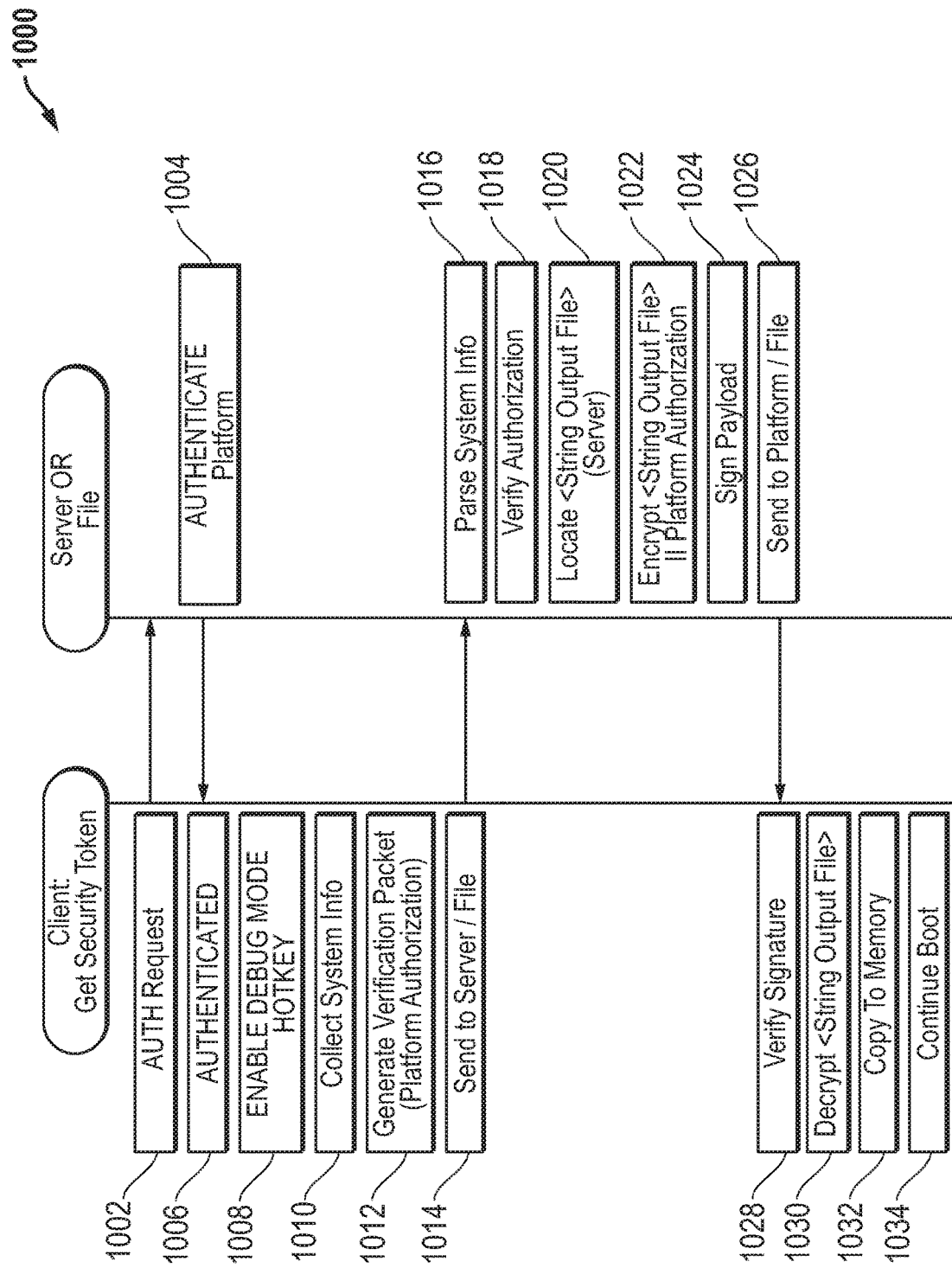
FIG. 10 illustrates interaction between components of a system under test and a server according to one exemplary embodiment of the disclosed systems and methods.

FIG. 10 illustrates one exemplary embodiment of optional security session interaction steps 1000 between components of a platform of system 100 under test and a server 157 or manufacturer authentication file for security purposes during system pre-boot. In one embodiment, the interaction of FIG. 10 may occur before allowing data of an external BIOS debug string output file (<String Output File>) 159 to be loaded into system volatile memory 120 of system 100 (e.g., such as in step 816 of FIG. 8) to convert a non-debug release mode BIOS to a debug mode BIOS. In this embodiment, platform security may be achieved using a trusted environment and public key infrastructure (PKI) protected Debug File Packets to fully provision and enable External BIOS Debug Messaging. As illustrated in FIG. 10, basic interaction steps may in one embodiment include authenticating the platform debug authorization level, e.g., via a Server 157, and/or an authorization file from the system manufacturer that may be stored on a storage device, removable media such as a USB flash drive, etc. In this way, the system platform 100 may be authenticated by an external service (e.g., on server 157 and/or by the authentication file) to ensure only authorized use in a trusted environment, and to prevent Debug Packet File reuse.

In FIG. 10, during pre-boot operation, system BIOS 194 of the system platform 100 may transmit an authentication request 1002 that contains system platform identification, a system platform nonce, and system information to server 157 or authentication file to authenticate the system 100 in order to allow the system platform 100 and BIOS 194 to go into debug mode. The server 157 or authentication file may respond in 1004 by using an authorization reply packet that is signed by the authentication server, which contains the system platform nonce, and a server nonce and system platform authorization level control setting to authenticate the system platform 100 and notifying the system 100 of successful platform authentication (assuming this occurs), and providing a session tag to system 100 in 1006. This unlocks the system platform 100 and allows a trusted environment. Only after successful authentication and notification in 1004 and 1006, BIOS 194 of system 100 may then enable debug hotkey in 1008 to allow a system user to enter the debug mode via hotkey actuation, and then collect system information such as system platform identification, firmware version information, a system platform nonce and system platform debug policy information in 1010. BIOS 194 of system 100 may generate a Platform Authentication Packet in 1012 containing the collected system information which system 100 sends to the Authentication Sever 157 or authentication file (e.g., either direct connect, or via file) 1014. The Platform Authentication Packet may also include data to protect against reuse, e.g., a random number NONCE that is associated with all current session information and that is only valid for the current session.

A host programmable integrated circuit 161 of the server 157 (or an authentication file executed by an authentication service) may respond to receipt of the Platform Authentication Packet in 1016 by parsing the system information and verifying system authentication in 1018. Assuming verification of authentication in 1018, the external BIOS debug string output file (<String Output File>) 159 is then located in 1020 (in the case of authentication by server 157), or is otherwise known in the case of verification by file 159 itself. Server 157 or file 159 then encrypts the BIOS debug string output file (<String Output File>) 159 to generate a packet that it authenticates with platform authentication in 1022 by concatenating the encrypted string output file and the platform authorization packet. The server 157 or file 159 generates a response Debug File Packet that is signed and encrypted with a Debug File Packet Private Key in 1024, and sends the Debug File Packet to system 100 in 1026.

The BIOS 194 of system platform 100 receives and authenticates or verifies the signature of the Debug File Packet specific to the system platform 100 in 1028. If the signature fails in 1028, system BIOS 194 disables the debug mode, clears out the artifacts and reboots. However, upon successful Debug File Packet verification in 1028, then in 1030, BIOS 194 of system 100 decrypts the Debug File Packet using a pre-existing Debug File Packet Public Key that is stored in a protected key storage location, such as the trusted platform module (TPM), or hardcoded in hardware, or in a verified code region on system 100. In 1032, the BIOS 194 of system 100 stores the decrypted Debug File Packet (that may also include a BIOS debug table as previously described) in system volatile memory 120 and sets an EC debug token as enabled in non-volatile storage 177, which indicates to the EC 180 that a trusted debug mode flag feature is fully enabled as per step 606 of FIG. 6. BIOS 194 of system 100 then continues the boot process in 1034.

During the following debug session, a debug message routine is implemented by system BIOS 194 which determines identity of individual debug messages that correspond to debug details (e.g., errors or conditions) determined during system debugging. In one embodiment, system BIOS 194 may provide a debug string number that corresponds to each particular debug message that is identified during system debugging. The BIOS debug table in system volatile memory 120 is then parsed by system BIOS 194 to find the debug string that corresponds to each identified debug message and to send each of these located debug strings to a debug device, e.g., such as to a serial port of system 100 where they may be buffered and processed once debug support is available, e.g., for storage to an file on an external storage device, for display on a display device 140 or external display device to system 100, etc. In one embodiment, during early BIOS flow debug string numbers of located debug strings may be reported and manually decoded. In one embodiment, the debug message routine may perform the following steps during debugging in a manner to find specific indicated debug messages (e.g., by message numbers in a recorded debug log) as described in relation to FIGS. 7, 8 and 9, it being understood that similar methodology may be employed for debug string identifiers other than numbers (e.g., such as alphanumeric characters):

1) Check if the BootFlags DEBUG_MODE bit was set, and exit if not.
2) Assuming BootFlags DEBUG_MODE bit was set, then find the indicated debug message in the debug message buffer, e.g., by multiplying the message number by 4 and adding 32. That points to the 16 bit message length.
3) Starting at that offset+2, send message length bytes out as debug messages.

It is noted that the above example debug message parameters are exemplary only, and that other parameters (e.g., other multiplication numbers and/or offset values) may be employed.

It will be understood that the steps of FIGS. 2-10 are exemplary only, and that any combination of fewer, additional and/or alternative steps may be employed that is suitable for creating, deploying and/or using of system BIOS components (e.g., such as BIOS debug messages, debugger firmware, UEFI drivers, etc.) that are stored separately from the remainder of system BIOS firmware for an information handling system.

It will also be understood that one or more of the tasks, functions, or methodologies described herein (e.g., including those described herein for components 110, 130, 150, 161, 180, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory storage device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method, comprising:
retrieving and executing a system basic input/output system (BIOS) firmware from a first non-volatile storage that is integrated on a system motherboard of an information handling system together with at least one programmable integrated circuit;
retrieving one or more supplemental BIOS components from a second non-volatile storage that is non-integrated and separate from the system motherboard, the supplemental BIOS components being different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files, and where each of the supplemental BIOS components retrieved from the second non-volatile storage is a given BIOS debug string corresponding to a respective different system error;
then starting a debug session and determining occurrence of one or more system errors during system debugging;
then identifying an individual BIOS debug message that corresponds to each of the determined one or more system errors;
then locating a BIOS debug string in the supplemental BIOS components that corresponds to each identified BIOS debug message; and
then at least one of storing each located BIOS debug string on a storage device or displaying each located BIOS debug string on a display device.

2. The method of claim 1, further comprising loading the system BIOS firmware into a system volatile memory of the information handling system from the first non-volatile storage, and executing the system BIOS firmware with the at least one programmable integrated circuit; selectively retrieving and loading the supplemental BIOS components from the second non-volatile storage into the system volatile memory; and executing the supplemental BIOS components together with the system BIOS firmware when the supplemental BIOS components are requested or called by the system BIOS firmware.

3. The method of claim 1, further comprising loading the system BIOS firmware into a system volatile memory of the information handling system from the first non-volatile storage, and executing the system BIOS firmware with the at least one programmable integrated circuit; then selectively retrieving and loading an external file containing the supplemental BIOS components from the second non-volatile storage into the system volatile memory; then attempting to authenticate the supplemental BIOS components loaded into the system volatile memory by comparing a value of a separately-provided security key to an existing hash value in a header of the external file that is computed based on the contents of the external file; and then executing the supplemental BIOS components together with the system BIOS firmware only if the hash value matches the security key value to authenticate the supplemental BIOS components, and not executing the supplemental BIOS components together with the system BIOS firmware only if the hash value does not match the security key value.

4. The method of claim 3, where the second non-volatile storage is external to the information handling system; and where the method further comprises selectively retrieving and loading the supplemental BIOS components across a network from a second information handling system coupled the second non-volatile storage into the system volatile memory; then attempting to authenticate the supplemental BIOS components loaded into the system volatile memory with information received across the network from the second information handling system; and then executing the supplemental BIOS components in the system volatile memory together with the system BIOS firmware only if the supplemental BIOS components pass the attempted authentication and are authenticated, and not executing the supplemental BIOS components in the system volatile memory together with the system BIOS firmware only if the supplemental BIOS components fail the attempted authentication and are not authenticated.

5. The method of claim 1, where the BIOS debug strings are each identified with a unique identifier; where the system BIOS firmware retrieved from the first non-volatile storage comprises BIOS firmware code that includes no BIOS debug messages and that presents no debug mode option to a system user; where the system BIOS firmware retrieved from the first non-volatile storage comprises BIOS firmware code includes calls to one or more of the unique BIOS debug string identifiers corresponding to the BIOS debug strings of the supplemental BIOS components; and where the method further comprises executing the system BIOS firmware to make one or more of the calls to the unique BIOS debug string identifiers corresponding to the located BIOS debug strings of the supplemental BIOS components, and then retrieving and outputting and/or displaying the called BIOS debug strings to an internal or external storage device and/or display device of the information handling system.

6. The method of claim 1, further comprising loading the system BIOS firmware into a system volatile memory of the information handling system from the first non-volatile storage, and executing the system BIOS firmware with the at least one programmable integrated circuit; then receiving a first input from a user upon power-on of the information handling system to request start of a BIOS debug mode; and then responding to the user request to start the BIOS debug mode during current and future system boots by retrieving the supplemental BIOS components from the second non-volatile storage and executing the supplemental BIOS components together with the system BIOS firmware in debug mode to determine occurrence of the system errors during current and future system boots only if the first input has been received from the user to request start of the BIOS debug mode.

7. The method of claim 6, further comprising then receiving a second input from a user upon a subsequent power-on of the information handling system to request stop of the BIOS debug mode; and then responding to the user request to stop the BIOS debug mode by not executing the supplemental BIOS components together with the system BIOS firmware during current and future system boots only if the second input has been received from the user to request stop of the BIOS debug mode.

8. The method of claim 7, further comprising:
setting a BIOS debug boot flag in non-volatile storage of the information handling system in response to receiving the first input;
then reading the non-volatile storage to detect the presence of the BIOS debug boot flag during current and future boots, and then responding to the detected presence of the flag in the non-volatile storage by retrieving the supplemental BIOS components from the second non-volatile storage and executing the supplemental BIOS components together with the system BIOS firmware during current and future system boots only if the flag is detected to be present in the non-volatile storage; and
then removing the flag from the non-volatile storage in response to receiving the second input, and then responding to the absence of the removed flag in the non-volatile storage by not executing the supplemental BIOS components together with the system BIOS firmware during current and future system boots only if the flag is detected not to be present in the non-volatile storage.

9. The method of claim 1, further comprising removing the supplemental BIOS components from a first BIOS firmware at a BIOS firmware build time, the remaining components of the first BIOS firmware forming a system BIOS firmware that does not include the removed supplemental BIOS components; and then storing the system BIOS firmware on the first non-volatile storage that is integrated on the system motherboard of the information handling system and storing the removed supplemental BIOS components on the second non-volatile storage that is non-integrated and separate from the system motherboard of the information handling system.

10. The method of claim 1, where a data capacity of the first non-volatile storage is less than a combined data size of the system BIOS firmware and the supplemental BIOS components.

11. The method of claim 1, where the system BIOS firmware retrieved from the first non-volatile storage comprises debug mode BIOS firmware code that includes default BIOS debug messages that are not the supplemental BIOS components; where the supplemental BIOS components retrieved from the second non-volatile storage comprise additional and different debug messages that are stored as the given BIOS debug strings corresponding to the respective different system errors; and where the method further comprises only executing the system BIOS firmware to selectively make one or more of the calls to the unique BIOS debug string identifiers corresponding to the additional and different BIOS debug strings of the supplemental BIOS components only when they correspond to one of the system errors that were previously determined during the system debugging.

12. An information handling system, comprising:
   a system motherboard;
   at least one programmable integrated circuit integrated on the system motherboard;
   a first non-volatile storage integrated on the system motherboard and coupled to the at least one programmable integrated circuit, the first non-volatile storage storing a system basic input/output system (BIOS) firmware; and
   a second non-volatile storage that is non-integrated and separate from the system motherboard, the second non-volatile storage being coupled to the at least one programmable integrated circuit and storing one or more supplemental BIOS components that are different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files, and where each of the supplemental BIOS components stored in the second non-volatile storage is a given BIOS debug string corresponding to a respective different system error;
   where the at least one programmable integrated circuit is programmed to:
      retrieve the BIOS firmware from the first non-volatile storage that is integrated on the system motherboard,
      retrieve the supplemental BIOS components from the second non-volatile storage that is non-integrated and separate from the system motherboard,
      then start a debug session and determine occurrence of one or more system errors during system debugging;
      then identify an individual BIOS debug message that corresponds to each of the determined one or more system errors;
      then locate a BIOS debug string in the supplemental BIOS components that corresponds to each identified BIOS debug message; and
      then at least one of store each located BIOS debug string on a storage device of the information handling system or display each located BIOS debug string on a display device of the information handling system.

13. The system of claim 12, further comprising system volatile memory coupled to the at least one programmable integrated circuit, the at least one programmable integrated circuit being programmed to:
   load the system BIOS firmware into the system volatile memory from the first non-volatile storage, and execute the system BIOS firmware with the at least one programmable integrated circuit;
   selectively retrieve and load the supplemental BIOS components from the second non-volatile storage into the system volatile memory; and
   then execute the supplemental BIOS components together with the system BIOS firmware when the supplemental BIOS components are requested or called by the system BIOS firmware.

14. The system of claim 12, further comprising system volatile memory coupled to the at least one programmable integrated circuit, the at least one programmable integrated circuit being programmed to:
   load the system BIOS firmware into the system volatile memory from the first non-volatile storage, and execute the system BIOS firmware with the at least one programmable integrated circuit;
   then selectively retrieve and load the supplemental BIOS components from the second non-volatile storage into the system volatile memory;
   then attempt to authenticate the supplemental BIOS components loaded into the system volatile memory; and
   then execute the supplemental BIOS components together with the system BIOS firmware only if the supplemental BIOS components pass the attempted authentication and are authenticated, and not execute the supplemental BIOS components together with the system BIOS firmware only if the supplemental BIOS components fail the attempted authentication and are not authenticated.

15. The system of claim 12, where the BIOS debug strings that are each identified with a unique identifier; where the system BIOS firmware stored in the first non-volatile storage comprises BIOS firmware code that includes no BIOS debug messages and that presents no debug mode option to a system user; where the system BIOS firmware stored in the first non-volatile storage comprises BIOS firmware code that includes calls to one or more of the unique BIOS debug string identifiers corresponding to the BIOS debug strings of the supplemental BIOS components; and where the at least one programmable integrated circuit is programmed to execute the system BIOS firmware to make one or more of the calls to the unique BIOS debug string identifiers corresponding to the located BIOS debug strings of the supplemental BIOS components, and to retrieve and output and/or display the called BIOS debug strings to an internal or external storage device and/or display device of the information handling system.

16. The system of claim 12, further comprising system volatile memory coupled to the at least one programmable integrated circuit, and an embedded controller coupled to at least one non-volatile storage of the system; where the embedded controller is programmed to:
   receive a first input from a user upon power-on of the information handling system upon system power-on to request start of a BIOS debug mode or receive a second input from a user upon power-on of the information handling system to request stop of an existing BIOS debug mode; and
   then respond to receipt of the first user input by setting a BIOS debug mode boot flag in the non-volatile storage of the system or respond to receipt of the second user input by removing any existing BIOS debug mode boot flag from the non-volatile storage of the system;
   where the at least one programmable integrated circuit is programmed to:
      load the system BIOS firmware into the system volatile memory from the first non-volatile storage, and execute the system BIOS firmware with the at least one programmable integrated circuit,
      then detect and respond to the detected presence of the BIOS debug mode boot flag in the non-volatile storage of the system during current and future system boots by retrieving the supplemental BIOS components from the second non-volatile storage and executing the supplemental BIOS components together with the system BIOS firmware during current and future system boots only if the presence of the BIOS debug mode is detected in the non-volatile storage.

17. The system of claim 12, where a data capacity of the first non-volatile storage is less than a combined data size of the system BIOS firmware and the supplemental BIOS components.

18. A method, comprising:
removing one or more supplemental BIOS components from a first BIOS firmware at a BIOS firmware build time, the remaining first BIOS firmware forming a system BIOS firmware that does not include the removed supplemental BIOS components, and where each of the removed supplemental BIOS components is a given BIOS debug string that corresponds to a respective different system error; and
then storing the system BIOS firmware on a first non-volatile storage that is integrated on a system motherboard of an information handling system, and storing the removed supplemental BIOS components on a second non-volatile storage that is non-integrated and separate from the system motherboard of the information handling system;
where the method further comprises:
separately locating each given source file in the first BIOS firmware,
creating a given pre-processed source file corresponding to each given located source file by separately pre-processing each given located given source file to replace all preprocessor directives, macros, and constants in the given located source file with a final value,
separately locating and removing any of the supplemental BIOS components located in each given pre-processed source file to modify source code of the given pre-processed source file prior to separately compiling the modified source code of each given modified pre-processed source file without source code corresponding to the removed supplemental BIOS components to form a separate given compiled modified source file corresponding to each given pre-processed source file, and
then linking together all separate given compiled modified source files.

19. The method of claim 18, where the system BIOS firmware includes no BIOS debug messages; and where the method further comprises:
identifying each removed BIOS debug string with a unique identifier;
storing the unique identifier of each removed BIOS debug string in an index;
replacing any debug message call to each given removed BIOS debug string in the system BIOS firmware with a call to the unique identifier of the given removed BIOS debug string; and
then storing the removed BIOS debug strings with the index as an external BIOS debug string output file on the second non-volatile storage that is non-integrated and separate from the system motherboard of the information handling system.

20. The method of claim 19, further comprising calculating a hash of the data region contained in the external BIOS debug string output file; and updating a header structure of the external BIOS debug string output file to include the calculated hash.

21. The method of claim 18, where a data capacity of the first non-volatile storage is less than a combined data size of the system BIOS firmware and the supplemental BIOS components.

22. A method, comprising:
retrieving and executing a system basic input/output system (BIOS) firmware from a first non-volatile storage that is integrated on a system motherboard of an information handling system together with at least one programmable integrated circuit;
retrieving one or more supplemental BIOS components from a second non-volatile storage that is non-integrated and separate from the system motherboard, the supplemental BIOS components being different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files; and
executing the retrieved supplemental BIOS components together with the system BIOS firmware;
where the system BIOS firmware retrieved from the first non-volatile storage comprises debug mode BIOS firmware code that includes default BIOS debug messages; where the supplemental BIOS components retrieved from the second non-volatile storage comprise additional and different debug messages that are stored as BIOS debug strings; and where the method further comprises only executing the system BIOS firmware to selectively make one or more of the calls to the unique BIOS debug string identifiers corresponding to the additional and different BIOS debug strings of the supplemental BIOS components only when needed for debugging.

23. The method of claim 11, where the default BIOS debug messages that are not the supplemental BIOS components comprise at least one of BIOS status codes or BIOS error messages; and where the additional and different BIOS debug strings of the supplemental BIOS components comprise a log of the boot process that shows the boot progress.

24. A method, comprising:
retrieving and executing a system basic input/output system (BIOS) firmware from a first non-volatile storage that is integrated on a system motherboard of an information handling system together with at least one programmable integrated circuit;
retrieving one or more supplemental BIOS components from a second non-volatile storage that is non-integrated and separate from the system motherboard, the supplemental BIOS components being different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files; and
executing the retrieved supplemental BIOS components together with the system BIOS firmware;

where the supplemental BIOS components retrieved from the second non-volatile storage comprise debugger firmware providing an interface to allow a user of the information handling system to change memory or PCI-Express (PCIe) register contents before the information handling system boots; and where the method further comprises:
executing the debugger firmware prior to booting the information handling system to provide the interface to the user of the information handling system,
executing the debugger firmware prior to booting the information handling system to change the memory or PCI-Express (PCIe) register contents in response to a user input made to the provided interface to the information handling system, and
then booting the information handling system.

25. A method, comprising:

retrieving and executing a system basic input/output system (BIOS) firmware from a first non-volatile storage that is integrated on a system motherboard of an information handling system together with at least one programmable integrated circuit;

retrieving one or more supplemental BIOS components from a second non-volatile storage that is non-integrated and separate from the system motherboard, the supplemental BIOS components being different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files; and executing the retrieved supplemental BIOS components together with the system BIOS firmware;

where the supplemental BIOS components retrieved from the second non-volatile storage comprise debugger firmware providing an interface to allow a user of the information handling system to step through firmware instructions before the information handling system boots; and where the method further comprises:
executing the debugger firmware prior to booting the information handling system to provide the interface to the user of the information handling system,
stepping through the firmware instructions in response to a user input made to the provided interface to the information handling system, and
then booting the information handling system.

26. A method, comprising:

retrieving and executing a system basic input/output system (BIOS) firmware from a first non-volatile storage that is integrated on a system motherboard of an information handling system together with at least one programmable integrated circuit;

retrieving one or more supplemental BIOS components from a second non-volatile storage that is non-integrated and separate from the system motherboard, the supplemental BIOS components being different from the system BIOS firmware, the supplemental BIOS components being removed from separate pre-processed source files of a BIOS firmware to modify source code of the source files of the BIOS firmware prior to separately compiling the modified source code of each modified pre-processed source file of the BIOS firmware without source code corresponding to the removed supplemental BIOS components and linking together all separately compiled modified source files; and executing the retrieved supplemental BIOS components together with the system BIOS firmware;

where the supplemental BIOS components retrieved from the second non-volatile storage comprise a Unified Extensible Firmware Interface (UEFI) driver enabling one or more additional BIOS capabilities for the information handling system that are not provided by the system BIOS firmware retrieved from the first non-volatile storage, the one or more additional BIOS capabilities comprising at least one of booting to a new type of storage device or supporting an external PCI-Express (PCIe) card.

* * * * *